US006388365B1

United States Patent
Grehant

(10) Patent No.: US 6,388,365 B1
(45) Date of Patent: May 14, 2002

(54) TRAVELING WAVE ULTRASONIC MOTOR

(75) Inventor: Bernard Grehant, Nancy-sur-Cluses (FR)

(73) Assignee: Metabole Developpement et Conseil, Cluses (FR)

(*) Notice: Subject to any disclaimer, the term of this patent is extended or adjusted under 35 U.S.C. 154(b) by 0 days.

(21) Appl. No.: 09/678,076

(22) Filed: Oct. 3, 2000

(30) Foreign Application Priority Data

Oct. 5, 1999 (FR) .............................. 99 12405

(51) Int. Cl.[7] .............................................. H02N 2/16
(52) U.S. Cl. ............................ 310/323.03; 310/323.08; 310/323.13
(58) Field of Search ....................... 310/323.03, 323.04, 310/323.08, 323.09, 323.13

(56) References Cited

U.S. PATENT DOCUMENTS

| | | | | |
|---|---|---|---|---|
| 4,210,028 A | * | 7/1980 | Hildebrande ................... | 73/598 |
| 4,562,374 A | | 12/1985 | Sashida ................... | 310/323.01 |
| 4,613,782 A | | 9/1986 | Mori ........................... | 310/328 |
| 4,882,500 A | | 11/1989 | Iijima ..................... | 310/323.01 |
| 5,298,829 A | | 3/1994 | Tsukimoto et al. .... | 310/323.01 |
| 5,402,030 A | | 3/1995 | Mukohjima ............ | 310/323.13 |
| 5,532,540 A | | 7/1996 | Claeyssen et al. .......... | 311/328 |
| 5,648,696 A | | 7/1997 | Le Letty et al. ......... | 310/323.01 |
| 5,722,444 A | * | 3/1998 | Prokopenko et al. ....... | 134/184 |
| 5,726,519 A | * | 3/1998 | Gonnard et al. ........ | 310/323.03 |
| 5,828,158 A | | 10/1998 | Chatellard ................... | 310/328 |
| 6,072,265 A | | 6/2000 | Grehant et al. ......... | 310/316.02 |
| 6,093,994 A | | 7/2000 | Petit ....................... | 310/323.04 |

FOREIGN PATENT DOCUMENTS

| | | | | |
|---|---|---|---|---|
| EP | 0441540 A | 8/1991 | ........... | H01L/41/08 |
| EP | 0569673 B | 3/1993 | ........... | H01L/41/09 |
| FR | 2709213 | 8/1993 | ............ | H02N/2/00 |
| FR | 2709214 A | 2/1995 | ............ | H02N/2/16 |
| SU | 681479 | 8/1979 | ........... | H01L/41/10 |

\* cited by examiner

*Primary Examiner*—Thomas M. Dougherty
(74) *Attorney, Agent, or Firm*—Bugnion S.A.; John Moetteli

(57) ABSTRACT

A traveling wave ultrasonic motor includes a ring-shaped stator (2) and two groups of electromechanical transducers (3 to 6). Each group comprises a pair of diametrically opposed longitudinal transducers, polarized in opposite directions, disposed perpendicularly to the stator (2). The transducers are in permanent contact with the stator (2) and excited by an alternating current with a π/2 phase shift between the groups so as to produce a traveling wave-like deformation on the surface of the stator (2). The motor comprises at least one rotor (1) held elastically in contact with the stator (2) for the rotational driving thereof by the traveling wave produced on the stator. The stator is in contact with the rotor only via two or four equal and diametrically opposed segments (9, 10) whose aggregate span is at most equal to a wavelength of the traveling wave produced in the stator.

21 Claims, 4 Drawing Sheets

TRAVELING WAVE ULTRASONIC MOTOR

BACKGROUND OF THE INVENTION

The invention relates to a traveling wave ultrasonic motor, in particular, a motor that produces a traveling wave-like deformation on the surface of a stator and a rotor held elastically in contact with the stator for the rotational driving thereof by the traveling wave produced on the stator.

Such motors are known from U.S. Pat. No. 5,648,696, the content of which is incorporated by reference, and U.S. Pat. No. 5,726,519, the content of which is incorporated by reference. These piezoelectric motors are the result of research aimed at simplifying the mode of excitation proposed previously in the U.S. Pat. No. 4,562,374, the content of which is incorporated by reference, which describes for the first time a motor employing traveling wave drive through contact between a rotor and an annular stator in which the set of points of the contact surface is what gives rise to an elliptic motion and in which the creation of a traveling wave in the stator is achieved by applying the stator to a piezoelectric ceramic annulus working in the d31 mode. The simplification is in replacing the piezoelectric ceramic annulus by bar-shaped exciters using the longitudinal vibration mode or d33 mode, exhibiting better performance than the transverse mode d31. Furthermore, the exciters can consist of standard ceramic bars that are much less expensive to make than the flat annulae with alternating polarization. A structure which works in a similar manner is also described in the patent EP 0 569 673, the content of which is incorporated by reference.

The structure described in the U.S. Pat. No. 5,648,696 is composed of two coaxial rotors associated with two stators mounted between the rotors and of dual-polarization ceramic bars disposed between the stators and whose ends are respectively linked to each of the stators. This symmetric structure is advantageously used to benefit naturally from a nodal plane forming a fixed reference and allowing the fixing of the motor to the frame and the supplying of the transducers by means of a connector disposed in this nodal plane, as described in the U.S. Pat. No. 5,828,158, the content of which is incorporated by reference. At first sight, these structures appear to be practical and easy to implement. However, they in fact exhibit a major drawback, in that even when starting from geometrically perfect pieces, it is not possible to circumvent deformations of the stator annulus during the operation of static prestressing of the transducers. The structure described in the patent EP 0 569 673 seems to be less subject to this type of deformation, owing to the solid nature of the central core used, but this ignores the effect of amplification sought by the inventors, which amplifying effect applies equally to the undesirable static deformations and to the dynamic deformations. The amplitude of these static deformations may greatly exceed that of the traveling wave, so that one is very far from the contact conditions achieved in the case of excitation by geometrically uniform ceramic annulus bonded to the stator without prestress. Compensation for these defects requires sanding of the pieces after assembly and clamping of the structure, which operation is poorly suited to a simple process and renders subsequent surface treatment of said pieces problematic. Noncompensation for these defects may turn out to be catastrophic in terms of performance. If one considers, for example, a structure of the type described in the U.S. Pat. No. 6,093,994, the content of which is incorporated by reference, having, for each stator, four exciter elements, so as to produce therein a traveling wave of order 3 (three wavelengths), if one of the exciters is longer than the others, by 10 $\mu$m for example, the static deformation produced is far greater than the amplitude of the traveling wave which is a few $\mu$m. As a result the rotor/stator contact occurs only in the zone situated above the bar: the contact is driving over a positive half-wave and resistive over a negative half-wave, so that the resultant torque is zero and the motor does not turn. This shows that it is difficult, within industrial manufacture, to remedy this defect.

Even in the case where these geometrical defects are compensated for perfectly, a new effect will limit the performance of such longitudinal-excitation motors. This is the superimposing of radial vibrations on the normal and tangential vibrations produced in the stator. The system for the central prestressing of the ceramics is the origin of the radial component of vibration. This effect is described in the Yasuo patent, which seeks in particular to profit therefrom by inclining the zone of contact between stator and rotor. In this case, it is indeed the superimposing of the vibratory speeds which intervenes.

However, the consequence of the fact that the traveling wave is of multiple order is that, at any instant, several diametrically opposed zones of the rotor, in contact with the peaks of the traveling wave, are simultaneously subjected to antagonist radial forces. In order not to lose as much (or even more) energy in this type of contact, than is gathered in the motion, it is necessary:

either for the rotor to exhibit high flexibility in the radial direction (whilst remaining stiff in the tangential and normal direction), it being possible to achieve this through grooves in the rotor, or to modify the mode of contact.

There are in fact in the prior art numerous embodiments which exploit discontinuous contact between rotor and stator. In these embodiments, one, two or more vibrating elements, angularly distributed, will be used as stator assembly. Each vibrating element used exhibits an elliptical displacement on its surface owing to an excitation produced as appropriate by two perpendicular exciters (patents SU 681479 and U.S. Pat. No. 4,613,782, the contents of which are incorporated by reference) or aligned exciters (FR 2 709 213, the content of which is incorporated by reference, and U.S. Pat. No. 5,532,540, the content of which is incorporated by reference).

In all these cases, the vibrating elements form stator subassemblies. They are supplied in phase or with a phase shift related to the number of them and to their geometrical distribution (FR 2 709 213) and placed on one and the same fixed frame, but are not mechanically intercoupled.

Finally, there are in the prior art numerous embodiments exploiting discontinuous contact between rotor and stator, but this time without resorting to a two-phase supply. The principle is to use a tangential component of the vibratory velocity, tapped off from the small protuberances linked to an elastic body on which an exciter device generates standing waves. The U.S. Pat. No. 4,882,500, the content of which is incorporated by reference, describes various applications of linear or rotary motors, where the interest stems from employing a single electrical supply pathway to excite an elastic plate. Compared with traveling wave devices, these more economical motors exhibit low performance. The zones of the plate where the elliptical motion is usable actually represent a very small portion thereof.

The aim of the invention is to obviate the aforementioned drawbacks and, more particularly, to eliminate the spurious effects of radial vibrations.

SUMMARY OF THE INVENTION

A traveling wave ultrasonic motor is provided that has at least one ring-shaped stator, two groups of electromechanical transducers each having at least one pair of diametrically opposed longitudinal transducers, polarized in opposite directions, disposed perpendicularly to the stator, that is to say parallel to the axis of the motor, distributed around the stator, in permanent contact with the stator and excited by an alternating current with a π/2 phase shift between the groups so as to produce a traveling wave-like deformation on the surface of the stator, and at least one rotor held elastically in contact with the stator for the rotational driving thereof by the traveling wave produced on the stator.

The invention uses a traveling wave motor stator having longitudinal exciters of which only two or four diametrically opposed contact zones are exploited, per rotor.

The motor according to the invention is one wherein the stator is in contact with the rotor only via at least one pair of equal and diametrically opposed segments whose aggregate span is at most equal to a wavelength of the traveling wave produced in the stator.

The spurious effects of radial vibrations are thus eliminated and the invention makes it possible to exert a larger contact pressure between stator and rotor.

In the U.S. Pat. No. 5,298,829, the contents of which are incorporated by reference, it is proposed, with a different aim, to limit the contact between the stator and the rotor of a piezoelectric motor according to two diametrically opposed toothed segments. Given the mode used, the aggregate span of the bearing zones is appreciably greater than a wavelength so that this limited contact does not have the effect sought by the invention at all.

Furthermore, as far as the present invention is concerned, the introduction of an alternating nature into the mode of contact allows indirect measurement of the speed of the rotor from the stator supply signals alone.

BRIEF DESCRIPTION OF THE DRAWINGS

The appended drawing represents, by way of example, a mode of execution of the invention.

DESCRIPTION OF THE PREFERRED EMBODIMENT

Figure 1:
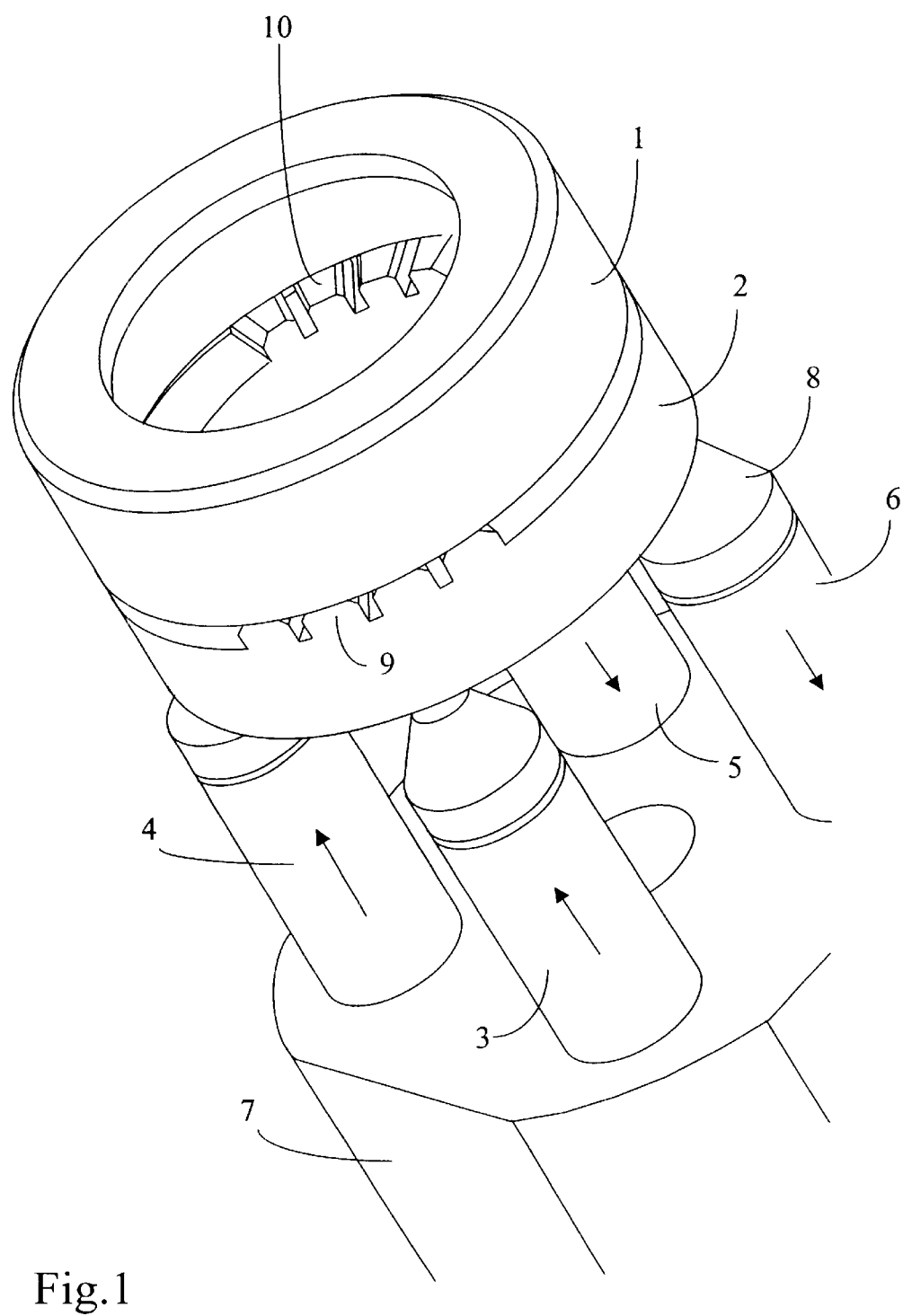
FIG. 1 is a perspective view of the essential elements of a motor having a stator and a rotor according to the invention.

The motor represented schematically in FIG. 1 exhibits a structure which is derived from the symmetric structures of the traveling wave piezoelectric motors described in the U.S. Pat. Nos. 5,648,696 and 5,726,519, the contents of which are incorporated herein by reference. The structure is here asymmetric, that is to say the motor has a single rotor 1 applied against a stator 2 associated with four electromechanical transducers 3, 4, 5, 6 bearing on a rigid bedplate 7. The rotor and the stator are annular in shape. The electromechanical transducers 3 to 6 are of the piezoelectric or magnetostrictive type or of any other type. In the description of the exemplary execution, it will be assumed that one is dealing with piezoelectric transducers in the form of cylindrical ceramic bars such as described in the U.S. Pat. Nos. 5,648,696 and 5,726,519. These bars are identical and paired as 3–5 and 4–6, the bars of each pair being diametrically opposed and symmetric relative to the axis of the motor. The bars are furthermore regularly distributed about the axis, in such a way that they are angularly offset mutually by 90°. The bars of each pair are polarized in opposite directions as indicated by the arrows in the drawing. Consequently, on going around the stator, one encounters in succession two bars 3 and 4 polarized in one direction, then two bars 5 and 6 polarized in the other direction. The transducers 3 to 6 bear against the stator 2 via conical articulation pieces 8 as described in the U.S. Pat. No. 6,093,994, which pieces limit the flexing of the bars. The stator 2 is pressed firmly by a central pillar, not represented, against the transducers 3 to 6. The rotor 1 is itself pressed elastically against the stator 2. The means of prestress and of pressure are, for example, embodied as described and represented in the U.S. Pat. No. 5,726,519. The central pillar can be hollowed out for the passage of a shaft on which the rotor 1 is mounted with slight radial play.

The diametrically opposed transducers form a group supplied by the same signal. They therefore vibrate in phase opposition. The two groups are supplied via two phase quadrature signals, that is to say ones which are π/2 out of phase. The supply is effected, for example, by means of the circuit described in patent U.S. Pat. No. 6,072,265, the content of which is incorporated by reference, by way of a connector placed on the bedplate 7.

The structure could of course be symmetric as described in the U.S. Pat. Nos. 5,648,696 and 5,726,519 with a connector according to the U.S. Pat. No. 5,828,158 placed in the nodal plane, at the common base of the transducers.

Figure 2:
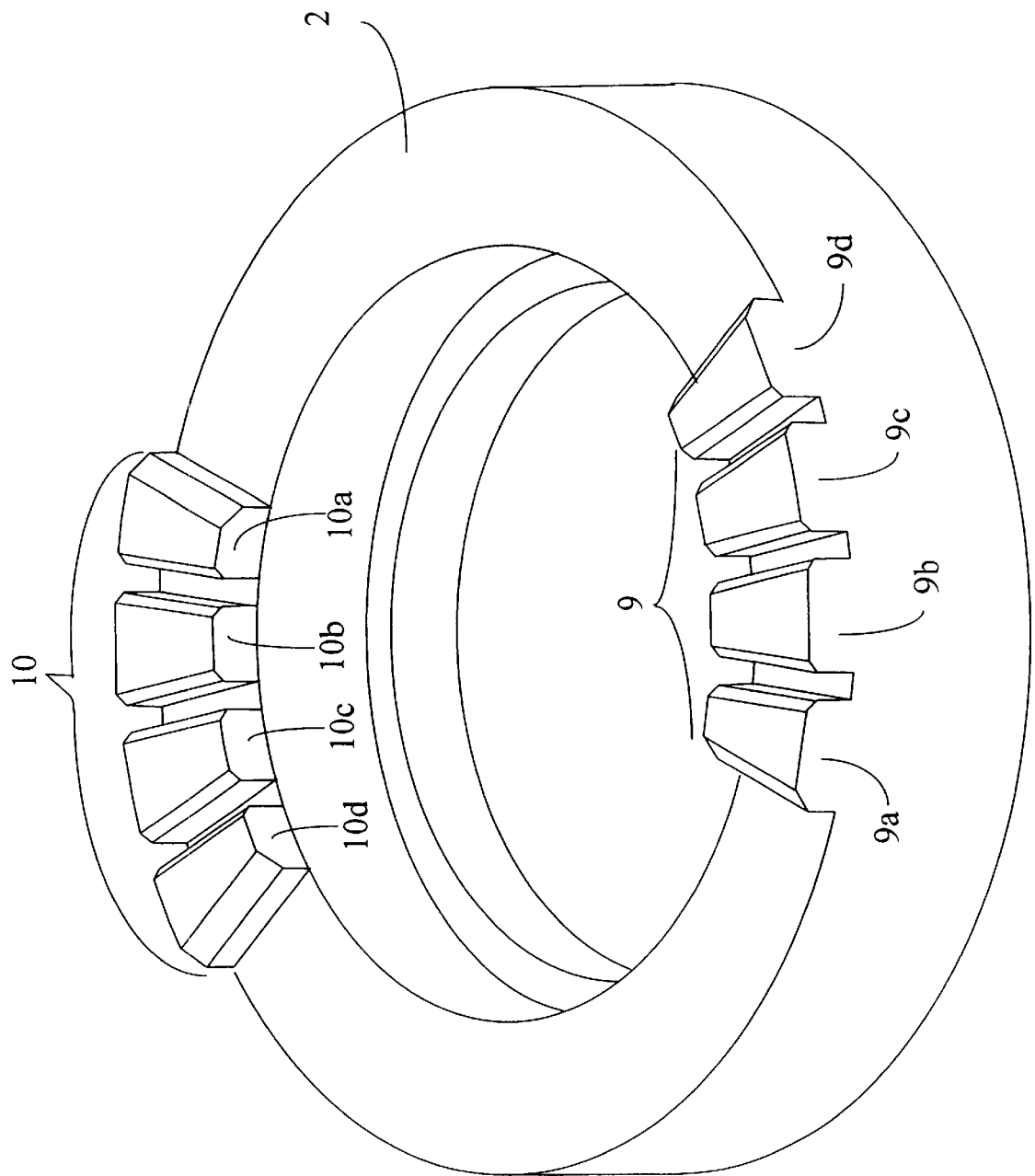
FIG. 2 is a perspective view of a stator of the motor represented in FIG. 1.

The stator 2 differs from the stators according to the prior art in that its contact with the rotor 1 spans only two diametrically opposed ring segments 9 and 10 of the same angular length. Advantageously, but not necessarily, these segments 9 and 10 are themselves subdivided, for example into four teeth 9a to 9d and 10a to 10d as represented in FIG. 2. This makes it possible, as is known, to amplify the tangential speeds without giving rise to overly rigid stators. Furthermore, the aggregate span of the segments 9 and 10 in the circumferential direction is chosen to be less than or equal to a wavelength of the traveling wave produced in the stator. In the example represented, the eight bearing teeth represent the teeth which remain out of the twenty-four teeth of a stator embodied according to the prior art. Within the dimensional limit indicated hereinabove, and if one wishes to avoid having to grind the stator once assembled, this span will be further reduced until the static deformation produced by the prestress becomes less than the useful dynamic deformation.

The segments 9 and 10 are situated either facing two transducers, or between two transducers.

Figure 5:
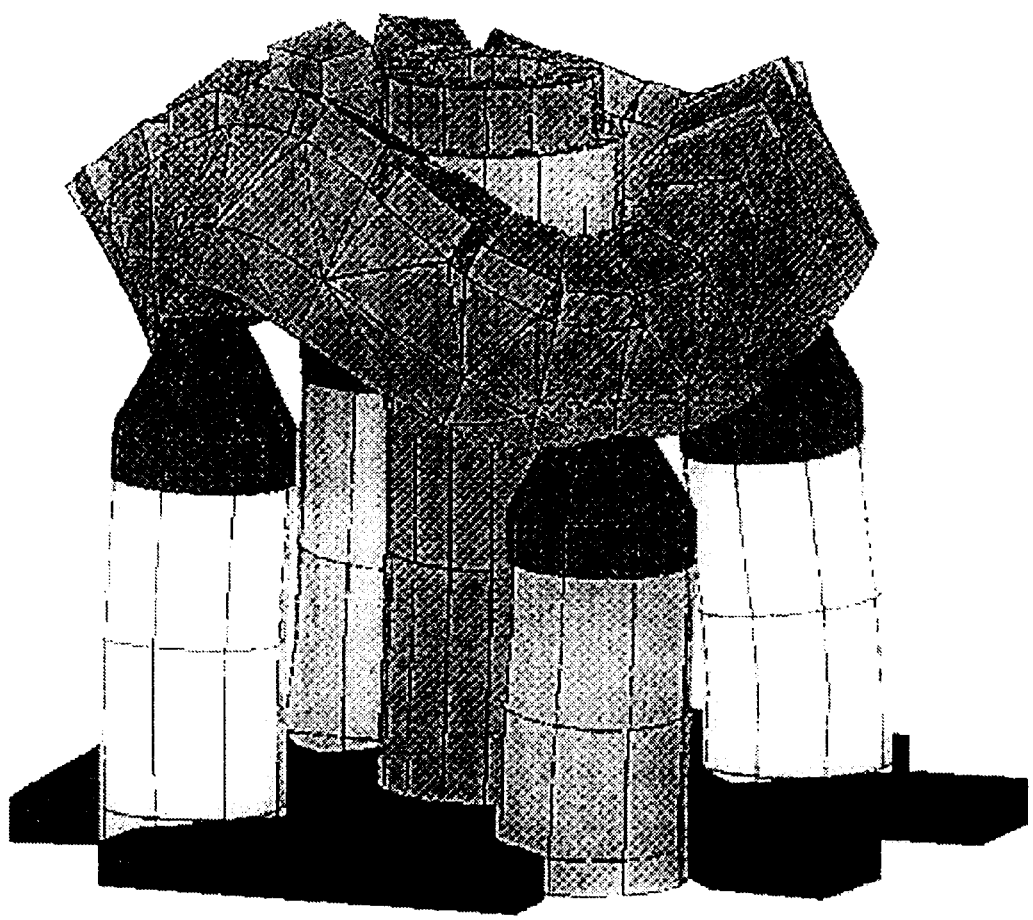
FIG. 5 represents a simulation of the effect obtained by a traveling wave having three wavelengths.

The effect obtained will be better understood through the simulation represented in FIG. 5 representing a motor according to the prior art supplied in mode 3. The figure shows the traveling wave with three wavelengths and the simulation portrays the radial deformation, highly exaggerated: the zones corresponding to a peak undergo a centripetal displacement, whereas the zones corresponding to a trough undergo a centrifugal displacement. If all the teeth are retained and the rotor is pressed against the stator, then three antagonist forces at 120° occur, localized on the peaks. The centripetal motions give rise to noise, heating and wear of the rotor.

According to the invention only a third (one wavelength) of the available contact zone is kept. Let us assume that at a given instant the segment 9 corresponds to a peak: then the segment 10 is on a trough. The two radial forces therefore have the same direction and no antagonist effect causes noise. The fact of keeping two diametrically opposed contact zones no longer affords any constraint to the radial motion.

It is of prime importance to avoid contact over three 120° zones.

The segments 9 and 10, and their teeth 9a to 9d and 10a to 10d respectively, exhibit either a plane contact face perpendicular to the axis of the stator, that is to say of the motor, or a face inclined relative to this axis, more precisely a face situated on a conical surface whose vertex is situated on the axis of the motor. Depending on whether the bearing faces of the segments are planar or conical, the rotor will exhibit a planar or conical surface of contact with the stator and its link with the shaft of the motor exhibits play compatible with radial motions.

Each rotor could consist of two concentric rotors, preferably elastically interlinked, of which one bears via a plane face on plane-faced segments and the other bears via a frustoconical face on conical-faced segments. In this case, the stator can exhibit two pairs of bearing segments offset by 90°, one exhibiting plane faces and the other inclined, respectively, conical faces.

On supplying the transducers, elliptical motions of the segments 9 and 10 appear both in the tangential and radial directions. There is considerable dynamic contact of the rotor with one of the segments during one half-period, then with the opposite segments during the other half-period. In each case, the contact is driving in the tangential direction. There is also radial motion of the rotor towards the opposite zone during one half-period, motion tolerated by the play with the shaft, and reverse motion during the following half-period.

The structure lends itself equally well to operation in mode 3 as in mode 1. In the latter case, the span of the contact segments is limited only by the amplitude of the static deformation warping of the stator, whose effects must be masked.

Apart from the fact that it makes it possible to eliminate the noise emitted and the energy dissipated by radial friction, the structure according to the invention exhibits the advantage of making it possible to extract, from the supply signals, information regarding the speed of the rotor. This is because the dynamic contact pressure directly influences the amplitudes and the relative phases of the currents absorbed on each supply pathway.

Figure 3:
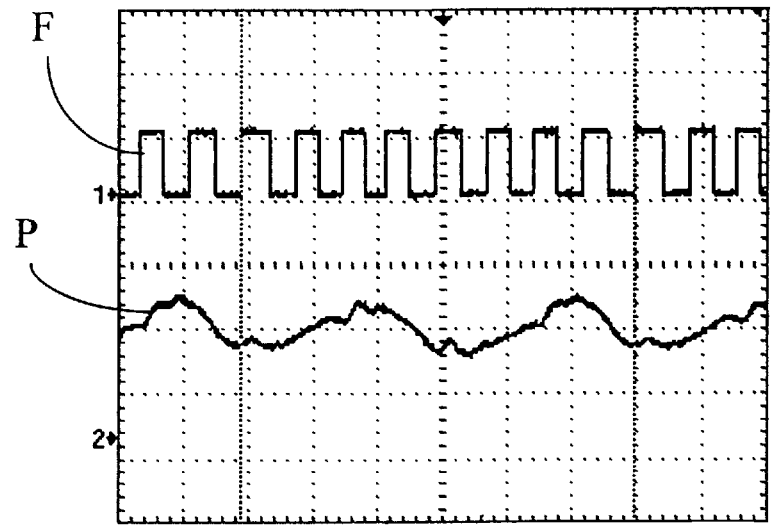
FIG. 3 is an exemplary recording of the relative phase between the current of a supply pathway and the supply voltage for a motor according to FIG. 1.
Figure 4:
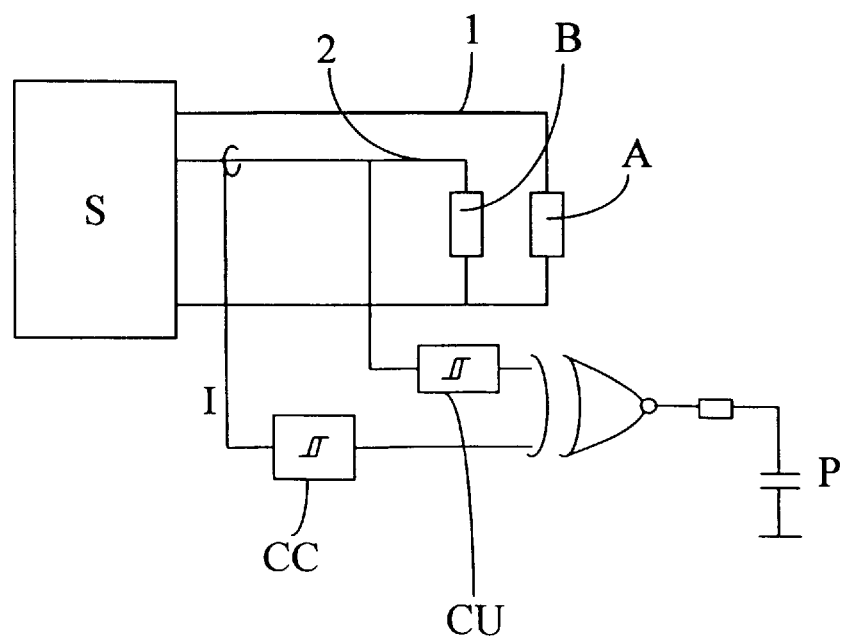
FIG. 4 represents the electrical diagram used in respect of the recording represented in FIG. 3.

FIG. 3 illustrates an exemplary recording of the relative phase P between the current I of a pathway and the supply voltage U for a motor with two contact segments. The circuit used for this purpose is a circuit well known to the person skilled in the art and which is represented as a reminder in FIG. 4. A and B represent the two pairs of transducers supplied from a source S. The voltage U and the current I in a supply pathway are respectively measured, which voltage and current are shaped and applied to a phase comparator. The signal P is obtained at the filtered output of the comparator. Depicted on the same recording is the logic signal F emanating from an angular sensor giving eight pulses per revolution. The periodicity of the signal P is noted. Careful examination shows that a signal period has two very slightly different alternations: this involves two alternating contacts on the other two segments 9 and 10 which are not strictly identical. The person skilled in the art is able through this alone to reconstruct, from this signal P, a logic signal whose frequency is therefore twice the frequency of rotation of the motor, this giving a measure of the speed of the motor.

In the case described previously, where two pairs of bearing segments, offset by 90°, are used, one plane and the other inclined, the frequency of the signal resulting from the variations in the contact pressures becomes quadruple the frequency of rotation of the rotors.

Since it is of prime importance to avoid contact over three 120° zones, it is possible to envisage contact over four segments. It is possible, at best, to reduce the contact to four contact segments situated respectively facing each of the transducers and whose aggregate span is less than one wavelength.

In this case, it is noted that there are four contact pressure maxima per complete period. The speed measurement is therefore twice as accurate.

Multiple variations and modifications are possible in the embodiments of the invention described here. Although certain illustrative embodiments of the invention have been shown and described here, a wide range of modifications, changes, and substitutions is contemplated in the foregoing disclosure. In some instances, some features of the present invention may be employed without a corresponding use of the other features. Accordingly, it is appropriate that the foregoing description be construed broadly and understood as being given by way of illustration and example only, the spirit and scope of the invention being limited only by the appended claims.

What is claimed:

1. A traveling wave ultrasonic motor comprising at least one ring-shaped stator (2), two groups of electromechanical transducers (3 to 6) each comprising at least one pair of diametrically opposed longitudinal transducers, polarized in opposite directions, disposed perpendicularly to the stator (2), that is to say parallel to the axis of the motor, distributed around the stator (2), in permanent contact with the stator (2) and excited by an alternating current with a $\pi/2$ phase shift between the groups so as to produce a traveling wave-like deformation on the surface of the stator (2), and at least one rotor (1) held elastically in contact with the stator (2) for the rotational driving thereof by the traveling wave produced on the stator, wherein the stator is in contact with the rotor only via at least one pair of equal and diametrically opposed segments (9, 10) whose aggregate span is at most equal to a wavelength of the traveling wave produced in the stator.

2. The motor as claimed in claim 1, wherein the contact segments (9, 10) are themselves segmented into several teeth (9a to 9d, 10a to 10d).

3. The motor as claimed in claim 1 or 2, wherein it comprises two pairs of transducers (3 to 6) offset by 90°, per stator.

4. The motor as claimed in claim 3, wherein the segments (9, 10) are situated facing the transducers.

5. The motor as claimed in claim 4, wherein the segments are four in number.

6. The motor as claimed in one of claims 1 to 2, wherein the segments (9, 10) are situated between the transducers.

7. The motor as claimed in claim 3, wherein the segments (9, 10) are situated between the transducers.

8. The motor as claimed in one of claims 1 to 2, wherein the segments (9, 10) exhibit a plane face perpendicular to the axis of the motor or a face inclined relative to the axis of the motor and wherein the rotor bears respectively on the plane faces via a plane part or on the inclined faces via a conical, respectively frustoconical surface.

9. The motor as claimed in claim 3, wherein the segments (9, 10) exhibit a plane face perpendicular to the axis of the motor or a face inclined relative to the axis of the motor and wherein the rotor bears respectively on the plane faces via a plane part or on the inclined faces via a conical, respectively frustoconical surface.

10. The motor as claimed in claim 8, wherein the plane-faced segments and the inclined-faced segments are offset mutually by 90°.

11. The motor as claimed in claim 6, wherein the segments (9, 10) exhibit a plane face perpendicular to the axis of the motor or a face inclined relative to the axis of the motor and wherein the rotor bears respectively on the plane faces via a plane part or on the inclined faces via a conical, respectively frustoconical surface.

12. An apparatus for measuring the frequency of rotation of a motor comprising a motor according to one of claim 1, 2, 4, 5 or 9, associated with a device for measuring the amplitude or the phase of the supply currents and equipped in such a way as to directly deliver a signal corresponding to the contact pressure on the segments (9, 10), said frequency being a multiple of the frequency of rotation of the motor.

13. The motor as claimed in one of claims 1 to 2, wherein the stator (2) exhibits segments having a plane face perpendicular to the axis of the motor and segments having a face inclined relative to the axis of the motor and wherein two concentric rotors bear, one on the plane faces via a plane part, the other on the inclined faces via a conical, respectively frustoconical surface.

14. The motor as claimed in claim 3, wherein the stator (2) exhibits segments having a plane face perpendicular to the axis of the motor and segments having a face inclined relative to the axis of the motor and wherein two concentric rotors bear, one on the plane faces via a plane part, the other on the inclined faces via a conical, respectively frustoconical surface.

15. The motor as claimed in claim 4, wherein the stator (2) exhibits segments having a plane face perpendicular to the axis of the motor and segments having a face inclined relative to the axis of the motor and wherein two concentric rotors bear, one on the plane faces via a plane part, the other on the inclined faces via a conical, respectively frustoconical surface.

16. The motor as claimed in claim 6, wherein the stator (2) exhibits segments having a plane face perpendicular to the axis of the motor and segments having a face inclined relative to the axis of the motor and wherein two concentric rotors bear, one on the plane faces via a plane part, the other on the inclined faces via a conical, respectively frustoconical surface.

17. The motor as claimed in claim 12, wherein the two concentric rotors are elastically interlinked.

18. The motor as claimed in claim 12, wherein the plane-faced segments and the inclined-faced segments are offset mutually by 90°.

19. The motor as claimed in claim 13, wherein the plane-faced segments and the inclined-faced segments are offset mutually by 90°.

20. The motor as claimed in one of claims 1 to 2, 4, 5, 7, 9, 11, 14, or 16–19, comprising a shaft carrying the rotor, wherein the rotor (1) is mounted with radial play on the shaft of the motor.

21. An apparatus for measuring the frequency of rotation of a motor comprising a motor according to one of claims 1 to 2, 4, 5, 7, 9, 11, 14, or 16–19, associated with a device for measuring the amplitude or the phase of the supply currents and equipped in such a way as to directly deliver a signal corresponding to the contact pressure on the segments (9, 10), said frequency being a multiple of the frequency of rotation of the motor.

* * * * *